US 6,464,230 B1

(12) United States Patent
Tong et al.

(10) Patent No.: US 6,464,230 B1
(45) Date of Patent: Oct. 15, 2002

(54) FLEXIBLE MAGNETIC RUBBER BRUSH SEAL FOR GENERATORS

(75) Inventors: Wei Tong, Clifton Park; Robert Russell Mayer, Schenectady; Mahmut Faruk Aksit, Troy, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/691,978

(22) Filed: Oct. 19, 2000

(51) Int. Cl.[7] .......................... F16J 15/44; F01D 11/02
(52) U.S. Cl. ...................................... 277/355; 277/410
(58) Field of Search .................................. 277/355, 410

(56) References Cited

U.S. PATENT DOCUMENTS

| | | | |
|---|---|---|---|
| 3,688,872 A | * | 9/1972 | Wagner .................... 184/6.28 |
| 3,733,501 A | * | 5/1973 | Heller et al. ................. 310/54 |
| 3,819,464 A | * | 6/1974 | Ungerer ...................... 161/64 |
| 4,076,259 A | | 2/1978 | Raimondi |
| 4,208,599 A | * | 6/1980 | Armor et al. ................. 310/64 |
| 4,281,838 A | * | 8/1981 | Persson ...................... 277/355 |
| 4,368,895 A | * | 1/1983 | Okamoto et al. |
| 4,403,779 A | | 9/1983 | Wilkinson |
| 4,486,024 A | | 12/1984 | Cooper |
| 4,497,172 A | * | 2/1985 | Smith ........................ 60/226.1 |
| 4,531,070 A | * | 7/1985 | Kuhn ........................... 310/56 |
| 4,600,202 A | * | 7/1986 | Schaeffler et al. ........... 277/355 |
| 4,696,480 A | * | 9/1987 | Jornhagen .................... 277/355 |
| 4,809,990 A | * | 3/1989 | Merz .......................... 277/355 |
| 4,815,748 A | | 3/1989 | Schubert |
| 4,924,817 A | | 5/1990 | Seelen |
| 4,957,301 A | * | 9/1990 | Clay, Jr. et al. |
| 5,090,710 A | | 2/1992 | Flower |
| 5,106,104 A | | 4/1992 | Atkinson et al. |
| 5,147,015 A | | 9/1992 | Snuttjer et al. |
| 5,400,586 A | | 3/1995 | Bagepalli et al. |
| 5,474,305 A | | 12/1995 | Flower |
| 5,480,160 A | * | 1/1996 | Harms |
| 5,613,829 A | * | 3/1997 | Wolfe et al. .............. 415/174.1 |
| 5,630,590 A | | 5/1997 | Bouchard et al. |
| 5,704,760 A | | 1/1998 | Bouchard et al. |
| 5,749,584 A | | 5/1998 | Skinner et al. |
| 5,961,279 A | * | 10/1999 | Ingistov ................... 415/170.1 |
| 5,971,400 A | | 10/1999 | Turnquist et al. |
| 5,997,004 A | | 12/1999 | Braun et al. |
| 6,027,121 A | | 2/2000 | Cromer et al. |
| 6,070,881 A | | 6/2000 | Longree |
| 6,082,740 A | | 7/2000 | Jones et al. |
| 6,257,588 B1 | | 7/2001 | Bagepalli et al. |

FOREIGN PATENT DOCUMENTS

| | | | |
|---|---|---|---|
| GB | 2 301 635 A | | 12/1996 |
| JP | 56-78354 | * | 6/1981 |
| TW | 293199 A | * | 12/1996 |

OTHER PUBLICATIONS

U.S. Patent Application S.N. 09/586,045, filed Jun. 2, 2000.
U.S. Patent Application S.N. 09/586,044, filed Jun. 2, 2000.
U.S. Patent Application S.N. 09/657,527, filed Sep. 8, 2000.

* cited by examiner

Primary Examiner—Anthony Knight
Assistant Examiner—Alison K Pickard
(74) Attorney, Agent, or Firm—Nixon & Vanderhye

(57) ABSTRACT

A flexible magnetic brush seal is employed as a low flow fluid film seal and/or a diffusion and mass transfer prevention seal in a hydrogen generator to seal between a hydrogen atmosphere and a fluid on an opposite side of the seal. The brush seal is formed of a magnetic rubber flexible material, enabling the seal to be flexed and altered in dimension to fit a number of different sealing environments of different dimensions. The magnetic properties of the brush seal enable temporary securement of the brush seal to a brush seal holder prior to final securement.

20 Claims, 4 Drawing Sheets

FLEXIBLE MAGNETIC RUBBER BRUSH SEAL FOR GENERATORS

CROSS-REFERENCE TO RELATED APPLICATIONS

This application is related to commonly-assigned applications Ser. No. 09/586,044, titled "Low Flow Fluid Film Seal for Hydrogen Cooled Generators"; Ser. No. 09/586,045, titled "Diffusion and Mass Transfer Prevention Seal for Hydrogen Cooled Generators" and Ser. No. 09/657,527, titled "Heat-Resistant Magnetic Silicone Rubber Brush Seals in Turbomachinery and Methods of Application," the subject matters of which are incorporated herein by reference.

BACKGROUND OF THE INVENTION

The present invention relates to generators, e.g., hydrogen cooled generators, and particularly relates to a flexible magnetic brush seal useful in various sealing environments in the generator. Particularly, the present invention relates to a hydrogen cooled generator employing a flexible magnetic rubber brush seal, e.g., as a low flow fluid film seal and/or as a diffusion and mass transfer prevention seal.

In turbomachinery such as gas and steam turbines, compressors and turbopumps, a number of seals are used at different locations for minimizing leakage flows. For example, seals may be provided between sealing surfaces which are both movable relative to one another or between components in which one component moves relative to another component, e.g., a housing wall and a rotating shaft.

Brush seals, particularly in turbomachinery, typically comprise a plurality of elongated wire bristles in contact with a movable, for example, rotating surface. The bristles provide a tight, rub-tolerant seal which experience only slight degradation over time. The bristles of the seal are compliant in use and thus minimize damage due to transient impact between the components being sealed. A typical brush seal is formed by folding bristles over a rod with an outer clamp maintaining the folded bristles, squeezing the bristles between a folded metal plate forming a clamp or sandwiching the bristles between a pair of supporting metal plates and welding the plates and bristles at their proximal ends to one another. The distal ends of the bristles typically project a certain distance from the margins of the backing plates or clamps to engage the opposing sealing component, for example, a rotor. Common to these types of brush seals is that the bristle holder or carrier is formed of metal which is usually machined with a tight tolerance and thus the brush seal is applicable only to specific sealing dimensions. For other sealing dimensions, for example, diameters, a separately manufactured and distinct brush seal must be used in order to dimensionally fit the seal with its carrier. Consequently, the brush seals are costly in terms of tooling, manufacturing and installation and long cycle times in brush seal manufacturing and retrofitting are required.

In generators, for example, hydrogen cooled generators, an end wall or casing surrounds a rotor and seals are interposed between the housing wall and the rotor to seal between a hydrogen atmosphere on one side of the wall and oil on the opposite side of the housing wall in a bearing cavity. Low flow fluid film seals are conventionally used on hydrogen cooled generators as dynamic rotor seals with near zero leakage. Turbine oil is the traditional working fluid of these seals because the turbine/generator unit must be supplied with turbine oil for its bearings. Low flow fluid film seals are generally directed along the rotor by a pair of low clearance rings about the rotor shaft. In a typical system, the oil flows past one seal ring into the bearing cavity and past the other seal ring and an additional oil deflection seal into the hydrogen environment within the housing wall. Oil entering the hydrogen side entrains hydrogen gas, which is then removed from the generator and vented from the system. Hydrogen consumption therefore represents a continuous and substantial expense to the user of the hydrogen cooled generator. The low flow fluid film seals and the oil deflection seals are typically about different diameters of the rotor.

BRIEF SUMMARY OF THE INVENTION

In accordance with a preferred embodiment of the present invention, there is provided a brush seal for use in a generator at various and different sealing locations. For example, in a hydrogen cooled generator, the brush seal hereof may be used as a low flow film seal and/or as a diffusion and mass transfer prevention seal. The seal of the present invention comprises a brush seal having a seal body formed of a flexible magnetic material such as magnetic silicone rubber material. Preferably, the bristles are embedded, glued or otherwise secured to the brush seal body such that the bristles project from the body, terminating in tips for sealing engagement with the opposing sealing component such as the generator rotor. The bristles are preferably formed of Kevlar® or polyester material. It will be appreciated that by bending the magnetic silicone rubber of the brush seal body, the brush seal can fit a wide range of sealing dimensions, e.g., diameters, in complex sealing geometry. For example, where the brush seal is to be applied between a fixed annular structure and a shaft rotating within the annulus, the brush seal may be flexed to conform to the dimensions of the two components. It will be appreciated that the brush seal body, together with the bristles carried thereby, can be flexed or bent into virtually any shape, e.g., an irregular or circular shape having different dimensions and thus may be used as a brush seal for differently dimensioned components, such as low flow fluid seals and/or diffusion and mass transfer prevention seals used in hydrogen cooled generators.

Additionally, by forming the brush seal body from a magnetic material, the seal can be readily adhered to one of the sealing components. Preferably, the adherence is temporary until the seal body can be adjusted and secured in final position. Ancillary jigs or fixtures useful to maintain the brush seal body in position while adjustments are being made prior to final securement are entirely eliminated. The magnetic rubber is preferably formed of a composite material of ferrite magnetic powder and a silicone polymer. With these characteristics, the brush seal body can be bent, twisted or coiled and thus easily configured for installation.

In accordance with a preferred embodiment of the present invention, the flexible magnetic brush seal can be used as a low flow fluid film seal in the hydrogen cooled generator which reduces the film flow of oil into the hydrogen atmosphere, thereby reducing hydrogen consumption, with the added benefits of facilitating manufacture and assembly of the brush seal. To accomplish this, the flexible magnetic low flow film seal is provided between the rotor and the housing wall, segregating the hydrogen atmosphere on one side of the wall and the oil and air mix of the bearing cavity on the opposite side of the wall. The flexible magnetic brush seals may be provided in pairs with a coil spring engaging between the pairs of brush seal bodies, biasing the bodies for axial separation and radial inward movement toward the rotor to maintain the bristles in contact with the rotor. In this sealing environment, oil or another fluid for forming the fluid film is pumped into the sealing space at a higher pressure than the seal casing. The oil or fluid is constricted by the brush seal to create a low flow film seal. By reducing the flow of the fluid to a minimum required to maintain a complete circumferential film, hydrogen consumption is reduced.

The flexible magnetic brush seal may also be employed as a diffusion and mass transfer prevention seal in a hydrogen cooled generator. Thus, the brush seal hereof may be interposed as an oil deflector seal between the hydrogen atmosphere on one side of a generator housing wall and a seal cavity on an opposite side of the oil deflector seal. The seal cavity is an intermediate cavity containing lower purity hydrogen than the hydrogen-filled generator casing and generally lies inboard of the low flow fluid film seal. Typically, this seal is employed at an axial location of the rotor having a different diameter than the rotor diameter at the location of the low flow fluid film seal. Thus, a larger diameter flexible magnetic brush seal hereof is provided across the seal casing and rotor between the hydrogen cooled generator cavity and the seal cavity. This seal cavity greatly reduces the flow of hydrogen from the generator cavity across the seal into the hydrogen seal cavity and flow of oil along the shaft into the generator housing. As a consequence, a significantly greater difference between the purity of hydrogen of the two cavities on opposite sides of the seal casing is provided, affording reduced diffusion and mass transfer of the hydrogen across the seal. The brush seal in this sealing environment is also bi-directional, i.e., not only preventing diffusion and mass transfer of hydrogen into the seal cavity but also serving to prevent oil or oil mist from the seal cavity from entering the generator cavity.

Significantly, while the diameters of the two brush seals described for use in the hydrogen cooled generator are different, the same stock brush seal can be used for both seals. That is, a linear brush seal can be fabricated and, when cut to appropriate length, used as either seal. The brush seal is therefore not limited to a fixed diameter but is useful for a large number of different seal diameters.

In a preferred embodiment according to the present invention, there is provided in a hydrogen cooled generator having a rotor, a component part and a seal sealing between the rotor and the component part for segregating an at least in part hydrogen atmosphere on one side of the seal and a cavity on an opposite side thereof, the seal including a brush seal extending between the component part and the rotor, the brush seal including a brush seal body and a plurality of bristles projecting from the body with tips thereof engaging the rotor, the brush seal body being formed of a flexible material.

In a further preferred embodiment according to the present invention, there is provided in a hydrogen cooled generator having a rotor and a seal sealing between the rotor and a housing wall for segregating a hydrogen atmosphere on one side of the seal and a seal cavity on an opposite side thereof containing a gas of lesser purity than the hydrogen atmosphere, the seal including a brush seal extending between the component part and the rotor, the brush seal including a brush seal body and a plurality of bristles projecting from the body with tips thereof engaging the rotor and preventing diffusion and mass transfer of the hydrogen atmosphere on one side of the wall into the seal cavity, the brush seal body being formed of a flexible magnetic material.

In a still further preferred embodiment according to the present invention, there is provided in a hydrogen cooled generator having a rotor and a seal sealing between the rotor and a housing wall with at least in part a hydrogen atmosphere on one side of the seal and a bearing cavity containing a fluid on an opposite side thereof, the seal including a low flow fluid film brush seal extending between the wall and the rotor, the brush seal including a brush seal body and a plurality of bristles projecting from the body with tips thereof engaging the rotor for substantially segregating the hydrogen atmosphere and the fluid in the bearing cavity, the brush seal body being formed of a flexible magnetic material.

DETAILED DESCRIPTION OF THE INVENTION

Figure 1:
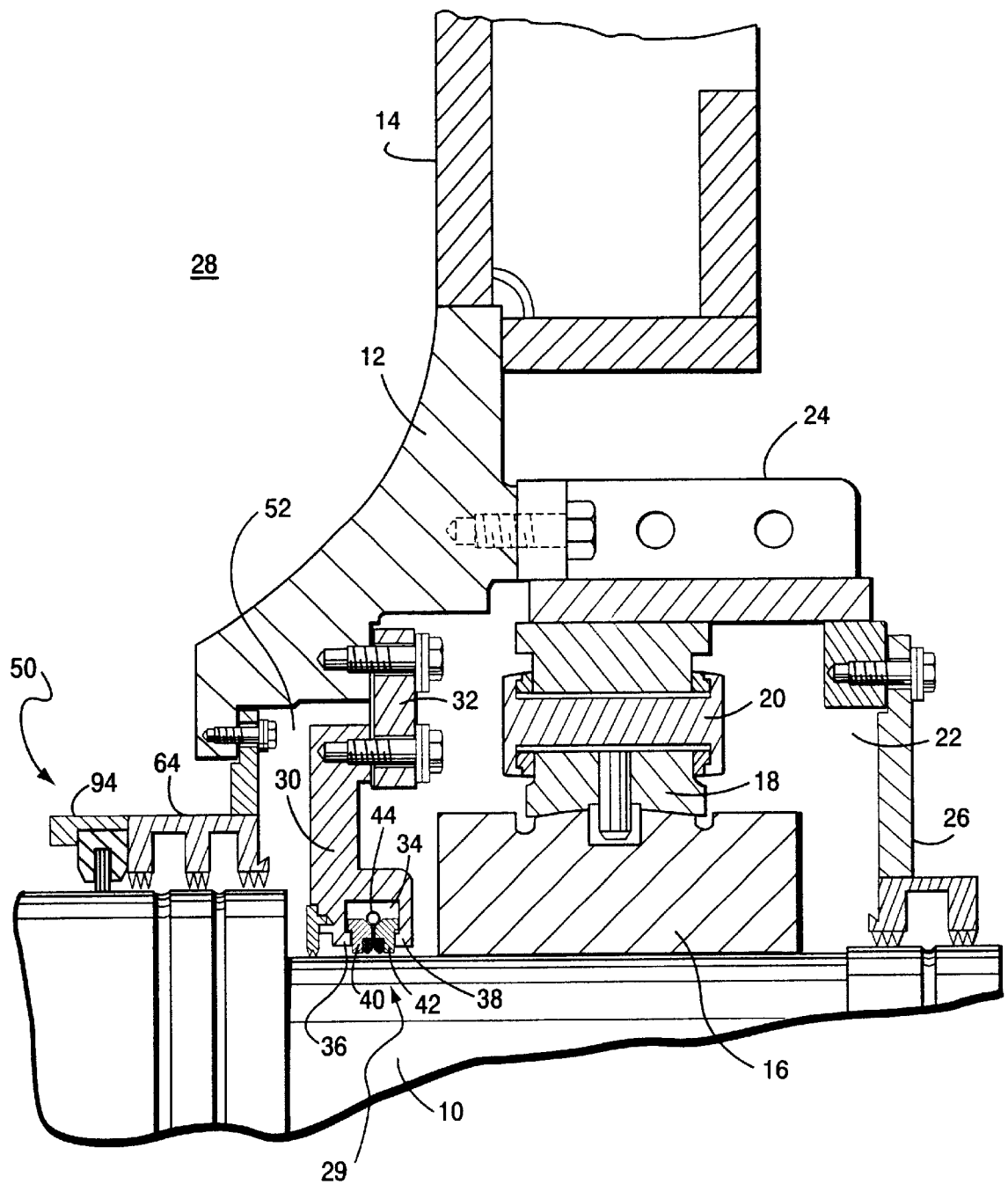
FIG. 1 is a fragmentary cross-sectional view of a pair of seals between a housing component and a rotor of a hydrogen cooled generator, constructed in accordance with a preferred embodiment of the present invention.

Referring now to the drawings, particularly to FIG. 1, an end portion of a hydrogen cooled generator having a rotor 10, a housing wall or casing 12, and a portion of an end shield 14 is illustrated. Also illustrated is a rotor shaft bearing 16 comprised of inner and outer bearing rings 18 and 20, respectively, disposed in a bearing cavity 22 containing oil and a bearing cap 24 which, together with an end oil deflector 26, closes off outside portions of the oil-bearing cavity 22 about rotor 10.

Along the inside surface of the housing wall 12 (to the left of wall 12 in FIG. 1), there is a hydrogen atmosphere designated 28 within the generator for cooling the generator. A low flow fluid film seal, generally designated 29, is provided between the rotor 10 and the housing wall or casing 12. The wall or casing 12 constitutes a component part of the hydrogen generator to maintain the hydrogen atmosphere 28 segregated from the fluid in oil-bearing cavity 22. A seal casing 30 is interposed between the housing wall 12 and rotor 10. The seal casing 30 comprises an annular plate or ring secured to insulation 32 along its radially outer diameter by bolts passing through insulation 32. As illustrated, the seal casing 30 includes an annular chamber 34 opening radially inwardly toward the rotor 10 and defined between a pair of axially spaced flanges 36 and 38. Within the chamber 34, there are provided a pair of low clearance seal rings 40 and 42. Also in chamber 34 is an annular garter spring 44 which engages against inclined surfaces 43 and 45 (FIG. 2) along radial outermost portions of the seal rings 40 and 42, respectively. The spring 44 biases the seal rings 40 and 42 axially and radially. It will be appreciated that the spring 44 may be formed in two generally semi-circular configurations attached to pins at opposite ends, the pins being secured to the seal casing 30. It will be appreciated that the cavity 34 is provide with oil under pressure to provide a thin film of oil along the surface of rotor 10. Brush seals housed within the seal rings 40 and 42 are described below.

One or more brush seals 74 described below may also be provided as part of a diffusion and mass transfer prevention oil deflector seal, generally designated 50. Seal 50 is disposed between the housing wall 12 and rotor 10 inboard of the seal casing 30 defining a seal cavity 52 therebetween. As a result, the seal cavity contains a significantly lesser purity of hydrogen than the hydrogen atmosphere in the generator cavity 28. The diffusion and mass transfer prevention seal 50 increases the resistance to diffusion and resistance to mass transfer of hydrogen across the seal 50 into the seal cavity 52 such that hydrogen consumption is substantially reduced. Note that the sealing diameter of the seal 50 is greater than the sealing diameter of seal 29.

In accordance with the present invention, one or more flexible magnetic brush seals are used as part of the low flow fluid film seal 29 and/or the diffusion and mass transfer prevention seal 50. The brush seal will be described in conjunction with the low flow fluid film seal and it will be appreciated that the brush seal as described is equally applicable to the diffusion and mass transfer prevention seal 50, albeit the seal diameters are different. In the low flow fluid film seal illustrated in FIG. 2, rings 40 and 42 have grooves 70 and 72, respectively. Identical brush seals are applied in each groove 70 and 72 and a description of one suffices for a description of the other.

The brush seal 74 includes a brush seal body 76 and a plurality of bristles 78 forming a bristle pack 80 carried by the brush seal body 76. In a preferred embodiment, the brush seal body 76 is comprised of a magnetic flexible silicone rubber material in the general shape of an elongated channel having a base 82 and opposite sides or legs 84 and 86. The bristle pack 80 comprises the bristles 78 disposed in the groove or channel of the body 76, terminating in bristle tips 88 engageable with rotor 10. Typically, the bristles are elongated, formed of metal and have diameters ranging from 0.002 to 0.01 inch, depending upon the temperature, pressure and sealing pattern in which the bristles are to be used. It will also be appreciated that non-metal materials such as aramid fibers, e.g., Kevlar®, may be utilized and in hydrogen cooled generators are preferred. While a magnetic silicone rubber is preferred, it will be appreciated that other types of materials may be used to form the channel, particularly in the present application, in which high temperatures and pressures are not typically encountered. The silicone rubber is comprised of ferrite magnetic powder and silicone polymer.

Figure 2:
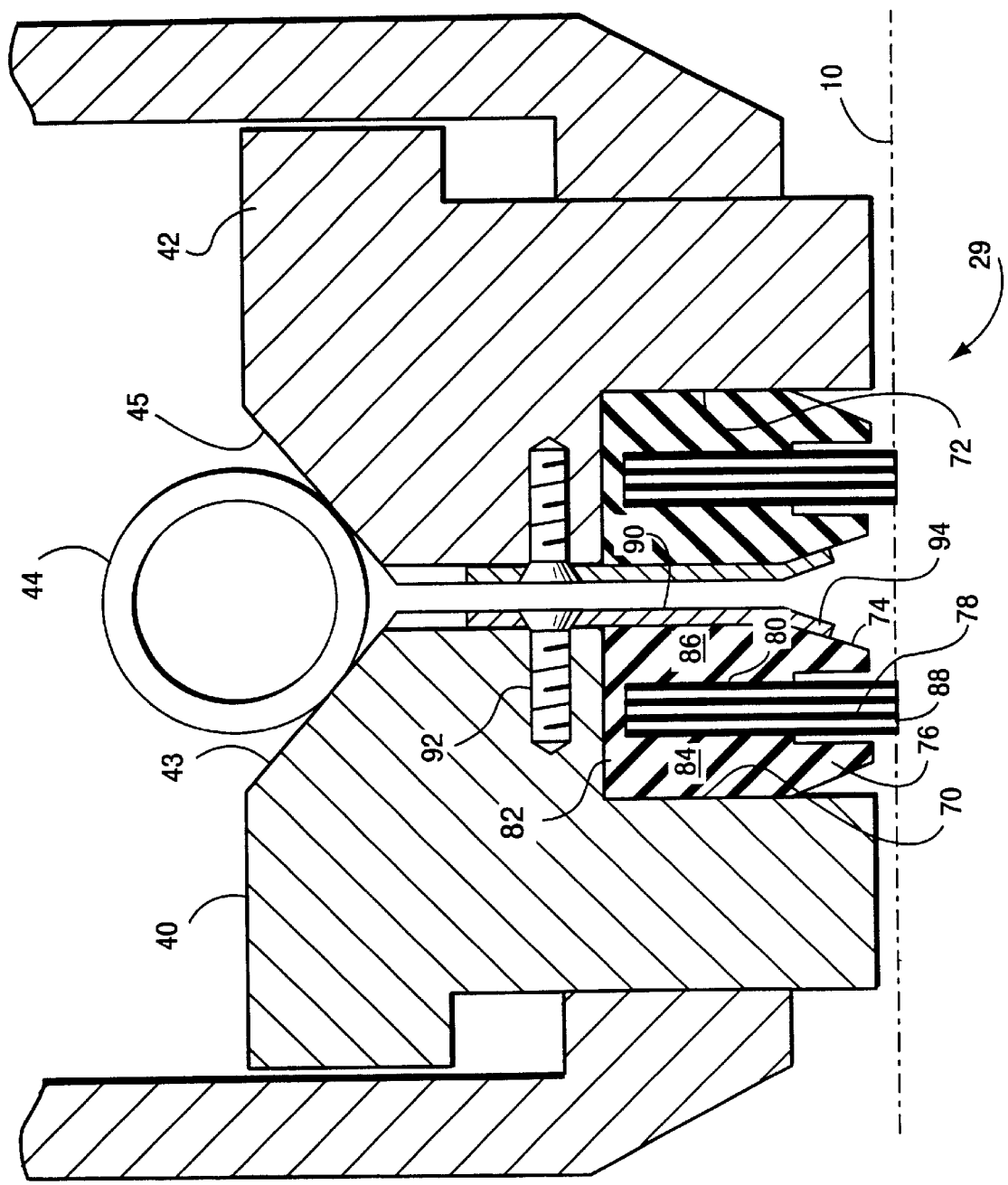
FIG. 2 is an enlarged fragmentary cross-sectional view of a low flow film seal corresponding to one of the seals illustrated in FIG. 1.
Figure 3:
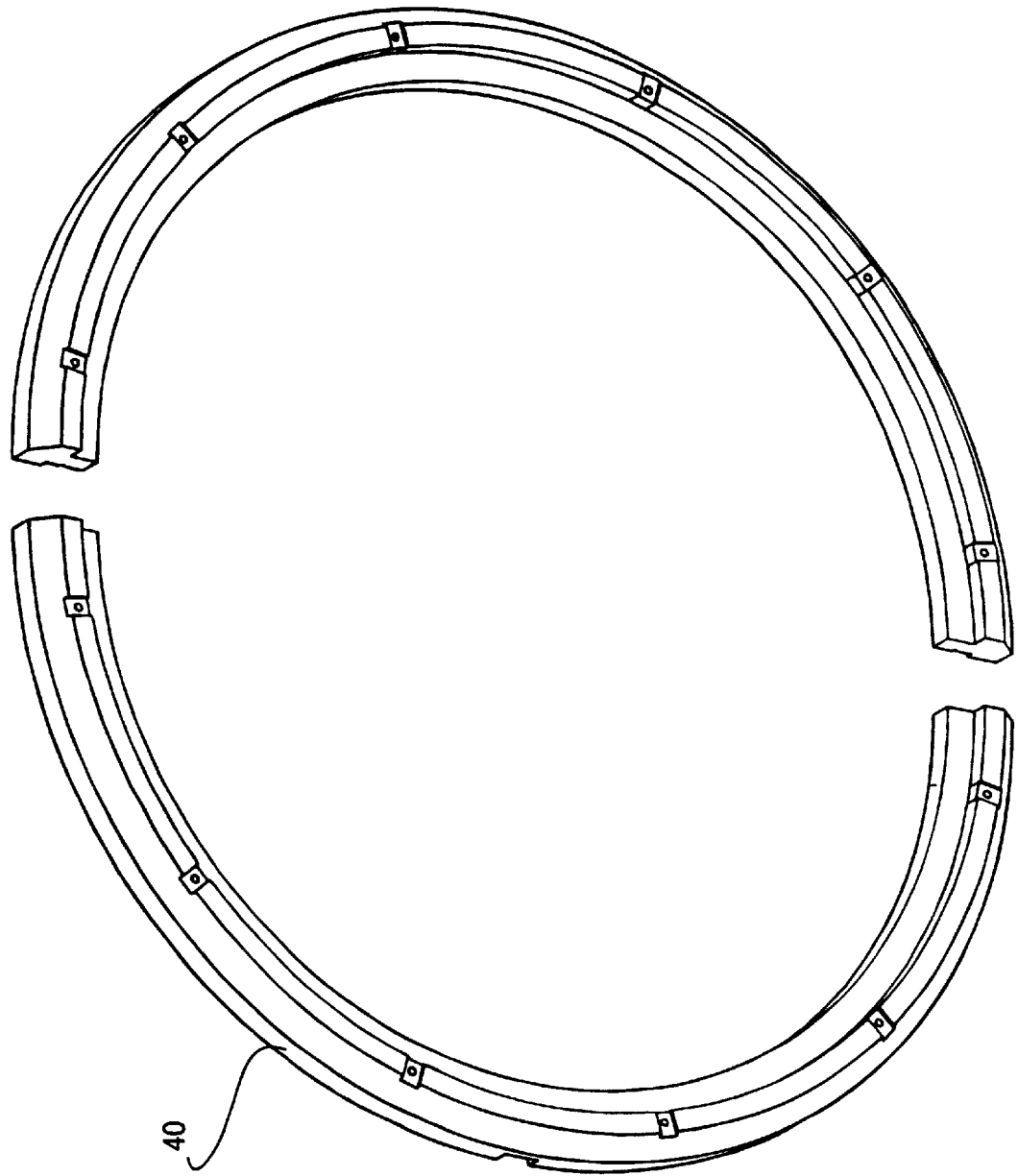
FIG. 3 is a perspective view of a pair of semi-circular seal rings for use in holding the brush seal.

With these characteristics, the brush seal body and bristles can be bent, twisted, coiled and easily fabricated. It will be appreciated that the seal can be readily fabricated, for example, by planting packed bristles in extruded magnetic rubber. Alternatively, a bristle pack with proximal ends of the bristles secured, for example, by welding to one another or about a rod, may be co-extruded with the rubber, for example, in a dovetail-type configuration, to retain the bristle pack within the rubber channel. Alternatively, the bristle pack with a dovetail-shaped proximal end may be inserted into a correspondingly-shaped slot in a circumferential direction into the rubber When used as a low flow fluid film seal 29 as illustrated in FIG. 2 and in the hydrogen cooled generator of FIG. 1, the seal rings 40 and 42 each containing the brush seal are arranged as mirror images of one another. The coil spring 44 maintains an axial gap between the seal rings 40 and 42, as well as maintains the tips of the bristles in contact with the rotor. The disclosed arrangement permits the seal rings 40 and 42 to be displaced in a radial direction.

Also as illustrated in FIG. 2, a brush clamp 90 is illustrated. The brush clamp 90 comprises a metal plate having an opening for receiving a fastener 92. Clamp 90 has a tapered end 94 for overlying a correspondingly tapered portion along the lower edge of the channel. Clamp 90 thus overlies the exposed annular side of the rubber brush seal and portions of the metal ring and is finally secured by fastener 92 to retain the brush seal in the groove. Also as noted in FIG. 2, the sides of the channel are recessed adjacent the distal end of the channel and away from the bristles. This permits the bristle tips to flex in either axial direction in the event of pressure changes on either side of the seal.

Figure 4:
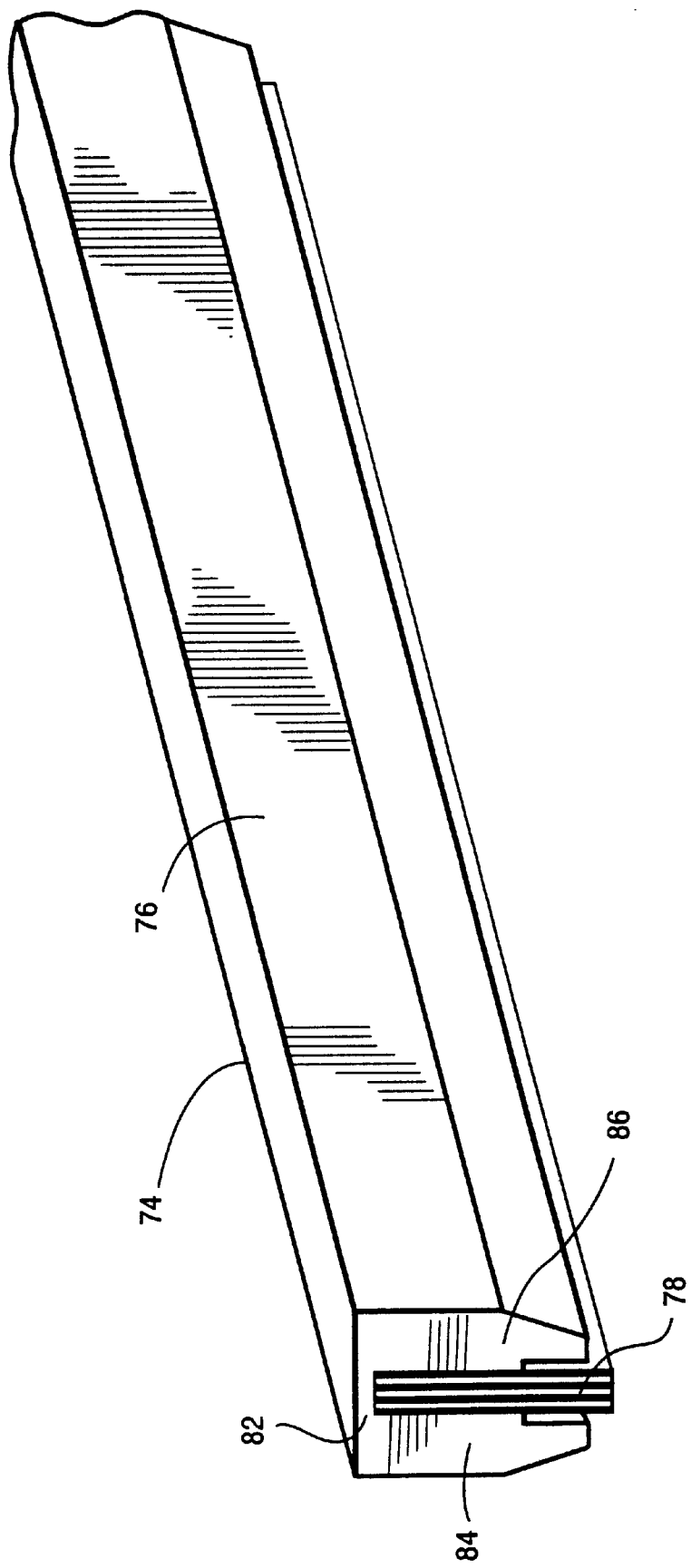
FIG. 4 is a fragmentary perspective view of the brush seal hereof.

A significant advantage of the brush seal of the present invention is that it may be formed in a linearly extending strip, for example, as illustrated in FIG. 4. For example, the rubber material may be extruded in the form of a channel with the bristles planted in the base of the channel-shaped extrusion and extending at a cant angle relative to the longitudinal dimension of the strip of about 40 to 50°. It will be appreciated that the linear extending strip can be bent or flexed to a variety of dimensions. Once the long dimension of the brush seal strip is determined for a particular sealing application, the strip can be cut to the appropriate length and flexed for reception in the seat of the seal, e.g., the groove 70 of the low flow fluid film seal or in the groove of a retainer ring 94 for the seal 50. Also, the magnetic material of the brush seal provides a magnetic attraction with the metal holder therefor. Consequently, the brush seal can be disposed in the holder and temporarily held by magnetic attraction, while the clamps are applied to finally secure the brush seal to its carrier.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A hydrogen cooled generator having a rotor, a component part and a seal sealing between said rotor and said component part for segregating an at least in part hydrogen atmosphere on one side of said seal and a cavity on an opposite side thereof, said seal including a brush seal extending between said component part and the rotor, said brush seal including a brush seal body and a plurality of bristles projecting from said body with tips thereof engaging the rotor, said brush seal body being formed of a flexible magnetic material.

2. A hydrogen cooled generator according to claim 1 wherein said bristles are formed of a non-metallic material.

3. A hydrogen cooled generator according to claim 1 wherein said bristles are formed of a plastic material.

4. A hydrogen cooled generator according to claim 1 wherein said material comprises a rubber material.

5. A hydrogen cooled generator according to claim 4 wherein said brush seal body has a length and is generally channel-shaped in cross-section, said bristles being at least partially disposed within the channel of said channel-shaped cross-section of said body.

6. A hydrogen cooled generator according to claim 1 wherein said component part includes a groove for receiving the brush seal body, said groove opening through an annular side of said component part, a brush seal clamp overlying said annular side and said brush seal body for retaining said brush seal body in said groove, and a fastener connecting said clamp and said component part to one another.

7. A hydrogen cooled generator according to claim 1 wherein said component part comprises a housing wall with a hydrogen atmosphere on said one side of said seal and wherein said cavity comprises a seal cavity on said opposite side of said seal containing a gas of lesser purity than the hydrogen atmosphere, said brush seal preventing diffusion and mass transfer of the hydrogen atmosphere on said one side of said wall into said seal cavity.

8. A hydrogen cooled generator according to claim 1 wherein said component comprises a housing wall with a hydrogen atmosphere on said one side of said seal and wherein said cavity comprises a bearing cavity containing a fluid on said opposite side of the housing wall, said seal comprising a low flow fluid film seal between said rotor and said housing wall for substantially segregating the hydrogen atmosphere and the fluid in the bearing cavity.

9. A hydrogen cooled generator according to claim 1 including a seal ring carried by said component part for radial movement, said brush seal body being carried by said seal ring for radial movement therewith.

10. A hydrogen cooled generator according to claim 9 wherein said rotor has an axis and said component part surrounds said rotor about said axis, a spring biasing said seal ring for radial inward movement toward said axis to substantially maintain the tips of said brush seal in engagement with the rotor.

11. A hydrogen cooled generator having a rotor and a seal sealing between said rotor and a housing wall for segregating a hydrogen atmosphere on one side of said seal and a seal cavity on an opposite side thereof containing a gas of lesser purity than the hydrogen atmosphere, said seal including a brush seal extending between said component part and the rotor, said brush seal including a brush seal body and a plurality of bristles projecting from said body with tips thereof engaging the rotor and preventing diffusion and mass transfer of the hydrogen atmosphere on said one side of said wall into said seal cavity, said brush seal body being formed of a flexible magnetic material.

12. A hydrogen cooled generator according to claim 11 wherein said bristles are formed of a non-metallic material.

13. A hydrogen cooled generator according to claim 11 wherein said bristles are formed of a plastic material.

14. A hydrogen cooled generator according to claim 11 wherein said material comprises a rubber material.

15. A hydrogen cooled generator according to claim 14 wherein said brush seal body has a length and is generally channel-shaped in cross-section, said bristles being at least partially disposed within the channel of said channel-shaped cross-section of said body.

16. A hydrogen cooled generator having a rotor and a seal sealing between said rotor and a housing wall with at least in part a hydrogen atmosphere on one side of said seal and a bearing cavity containing a fluid on an opposite side thereof, said seal including a low flow fluid film brush seal extending between said wall and the rotor, said brush seal including a brush seal body and a plurality of bristles projecting from said body with tips thereof engaging the rotor for substantially segregating the hydrogen atmosphere and the fluid in the bearing cavity, said brush seal body being formed of a flexible magnetic material.

17. A hydrogen cooled generator according to claim 16 wherein said bristles are formed of a non-metallic material.

18. A hydrogen cooled generator according to claim 16 wherein said bristles are formed of a plastic material.

19. A hydrogen cooled generator according to claim 16 wherein said flexible magnetic material comprises a rubber material.

20. A hydrogen cooled generator according to claim 19 wherein said brush seal body has a length and generally channel-shaped in cross-section, said bristles being at least partially disposed within the channel of said channel-shaped cross-section of said body.

* * * * *

UNITED STATES PATENT AND TRADEMARK OFFICE
CERTIFICATE OF CORRECTION

PATENT NO.    : 6,464,230 B1
DATED         : October 15, 2002
INVENTOR(S)   : Tong et al.

It is certified that error appears in the above-identified patent and that said Letters Patent is hereby corrected as shown below:

Column 5,
Line 56, after "rubber" insert -- channel --.

Signed and Sealed this

Twenty-fifth Day of February, 2003

JAMES E. ROGAN
*Director of the United States Patent and Trademark Office*